(12) United States Patent
Wolas

(10) Patent No.: US 7,640,754 B2
(45) Date of Patent: Jan. 5, 2010

(54) INSERT DUCT PIECE FOR THERMAL ELECTRIC MODULE

(75) Inventor: Scott R. Wolas, Newbury Park, CA (US)

(73) Assignee: Amerigon Incorporated, Northville, MI (US)

( * ) Notice: Subject to any disclaimer, the term of this patent is extended or adjusted under 35 U.S.C. 154(b) by 78 days.

(21) Appl. No.: 11/623,273

(22) Filed: Jan. 15, 2007

(65) Prior Publication Data
US 2008/0143152 A1   Jun. 19, 2008

Related U.S. Application Data

(60) Provisional application No. 60/869,944, filed on Dec. 14, 2006.

(51) Int. Cl.
F25B 21/02 (2006.01)
(52) U.S. Cl. .......................... 62/3.61; 62/3.2
(58) Field of Classification Search .............. 62/3.2, 62/3.61, 239
See application file for complete search history.

(56) References Cited

U.S. PATENT DOCUMENTS

| | | |
|---|---|---|
| 3,136,577 A | 6/1964 | Richard |
| 3,137,523 A | 6/1964 | Karner |
| 3,298,195 A | 1/1967 | Raskhodoff |
| 4,413,857 A | 11/1983 | Hayashi |
| 4,671,567 A | 6/1987 | Frobose |
| 4,685,727 A | 8/1987 | Cremer et al. |
| 5,002,336 A | 3/1991 | Feher |
| 5,106,161 A | 4/1992 | Meiller |
| 5,117,638 A * | 6/1992 | Feher .................. 62/3.2 |
| 5,385,382 A | 1/1995 | Single, II et al. |
| 5,524,439 A * | 6/1996 | Gallup et al. .............. 62/3.5 |
| 5,597,200 A | 1/1997 | Gregory et al. |
| 5,626,021 A | 5/1997 | Karunasiri et al. |
| 5,921,100 A | 7/1999 | Yoshinori et al. |
| 5,924,766 A | 7/1999 | Esaki et al. |
| 5,927,817 A | 7/1999 | Ekman et al. |
| 6,003,950 A | 12/1999 | Larsson |
| 6,019,420 A | 2/2000 | Faust et al. |
| 6,059,018 A | 5/2000 | Yoshinori et al. |

(Continued)

FOREIGN PATENT DOCUMENTS

DE        10238552       8/2001

(Continued)

OTHER PUBLICATIONS

International Search Report for PCT/US2007/085311 mailed Jun. 6, 2008 (PCT/US2007/085311 is the corresponding PCT of the present application).

*Primary Examiner*—Melvin Jones
(74) *Attorney, Agent, or Firm*—Knobbe Martens Olson & Bear LLP

(57) ABSTRACT

A climate control device comprises a housing, the housing having a first intake port, a first exhaust port, and a second exhaust port, wherein the first exhaust port opens in a different direction than the second exhaust port. A fan is disposed within the housing and is configured to draw air through the first intake port and expel air towards the first exhaust port and the second exhaust port. a separate insert piece configured to be inserted within the housing and adapted to direct substantially all the expelled air through one of the first or second exhaust ports.

14 Claims, 11 Drawing Sheets

U.S. PATENT DOCUMENTS

| | | | |
|---|---|---|---|
| 6,062,641 A * | 5/2000 | Suzuki et al. | 297/180.1 |
| 6,079,485 A | 6/2000 | Esaki et al. | |
| 6,119,463 A | 9/2000 | Bell | |
| 6,145,925 A | 11/2000 | Eksin et al. | |
| 6,186,592 B1 | 2/2001 | Orizaris et al. | |
| 6,189,966 B1 | 2/2001 | Faust et al. | |
| 6,196,627 B1 | 3/2001 | Faust et al. | |
| 6,206,465 B1 | 3/2001 | Faust et al. | |
| RE38,128 E | 6/2003 | Gallup et al. | |
| 6,598,251 B2 | 7/2003 | Habboub et al. | |
| 6,604,785 B2 | 8/2003 | Bargheer et al. | |
| 6,606,866 B2 | 8/2003 | Bell | |
| 6,619,736 B2 | 9/2003 | Stowe et al. | |
| 6,626,488 B2 | 9/2003 | Pfahler | |
| 6,644,735 B2 | 11/2003 | Bargheer et al. | |
| 6,676,207 B2 | 1/2004 | Rauh et al. | |
| 6,700,052 B2 | 3/2004 | Bell | |
| 6,761,399 B2 | 7/2004 | Bargheer et al. | |
| 6,786,541 B2 | 9/2004 | Haupt et al. | |
| 6,786,545 B2 | 9/2004 | Bargheer et al. | |
| 6,808,230 B2 | 10/2004 | Buss et al. | |
| 6,828,528 B2 | 12/2004 | Stowe et al. | |
| 6,857,697 B2 * | 2/2005 | Brennan et al. | 297/180.13 |
| 6,893,086 B2 | 5/2005 | Bajic et al. | |
| 6,962,195 B2 * | 11/2005 | Smith et al. | 165/202 |
| 6,976,734 B2 | 12/2005 | Stoewe | |
| 7,114,771 B2 | 1/2006 | Lofy et al. | |
| 7,070,232 B2 | 7/2006 | Minegishi et al. | |
| 7,108,319 B2 | 9/2006 | Hartwich et al. | |
| 7,201,441 B2 | 4/2007 | Stoewe et al. | |
| 2002/0092308 A1 | 7/2002 | Bell | |
| 2004/0090093 A1 | 5/2004 | Kamiya et al. | |
| 2005/0285438 A1 | 12/2005 | Ishima et al. | |
| 2006/0087160 A1 | 4/2006 | Dong et al. | |
| 2006/0130490 A1 | 6/2006 | Petrovski | |
| 2006/0200398 A1 | 9/2006 | Botton et al. | |
| 2006/0214480 A1 | 9/2006 | Terech | |
| 2006/0273646 A1 | 12/2006 | Comiskey et al. | |
| 2007/0069554 A1 | 3/2007 | Comiskey et al. | |
| 2007/0204629 A1 | 9/2007 | Lofy | |
| 2007/0241592 A1 | 10/2007 | Giffin et al. | |
| 2007/0262621 A1 | 11/2007 | Dong et al. | |
| 2007/0277313 A1 | 12/2007 | Terech | |
| 2008/0084095 A1 | 4/2008 | Wolas | |
| 2008/0087316 A1 | 4/2008 | Inaba et al. | |
| 2008/0164733 A1 | 7/2008 | Giffin | |

FOREIGN PATENT DOCUMENTS

| | | |
|---|---|---|
| DE | 10115242 | 10/2002 |
| WO | WO 02/11968 | 2/2002 |
| WO | WO 03/051666 | 6/2003 |

* cited by examiner

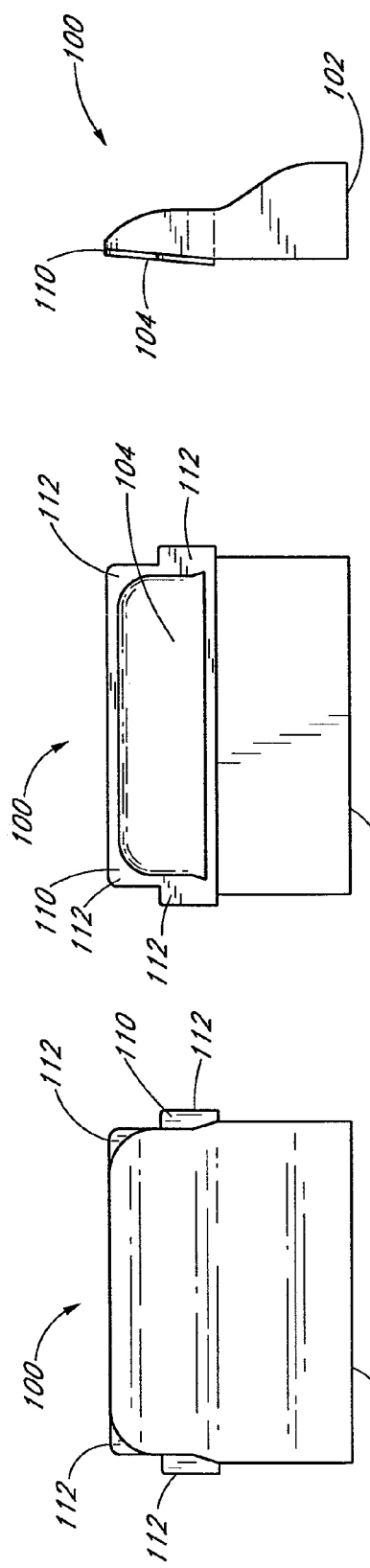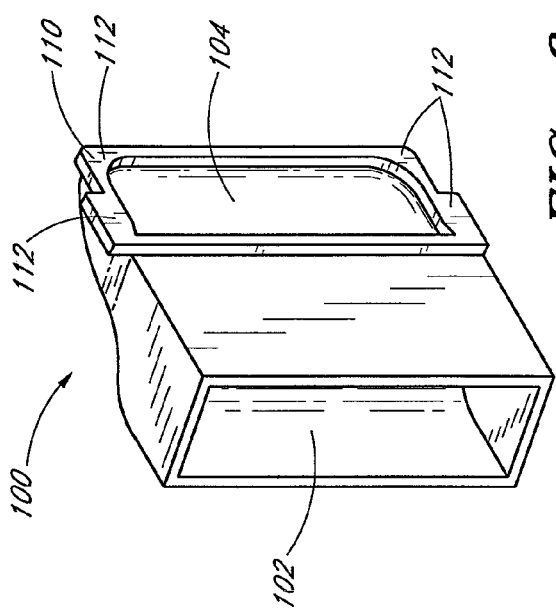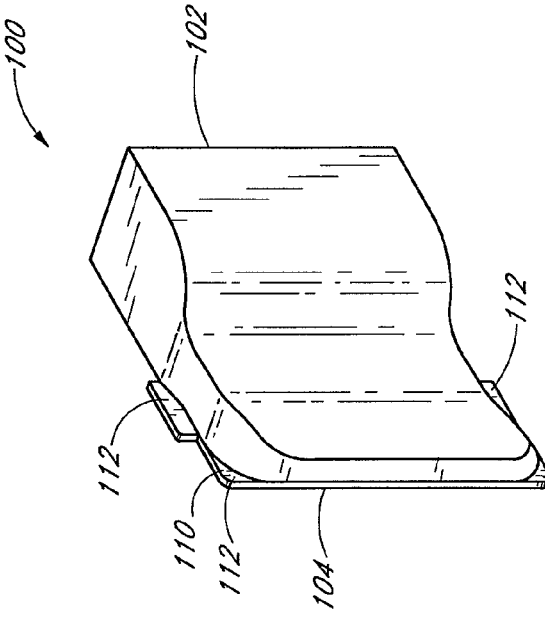

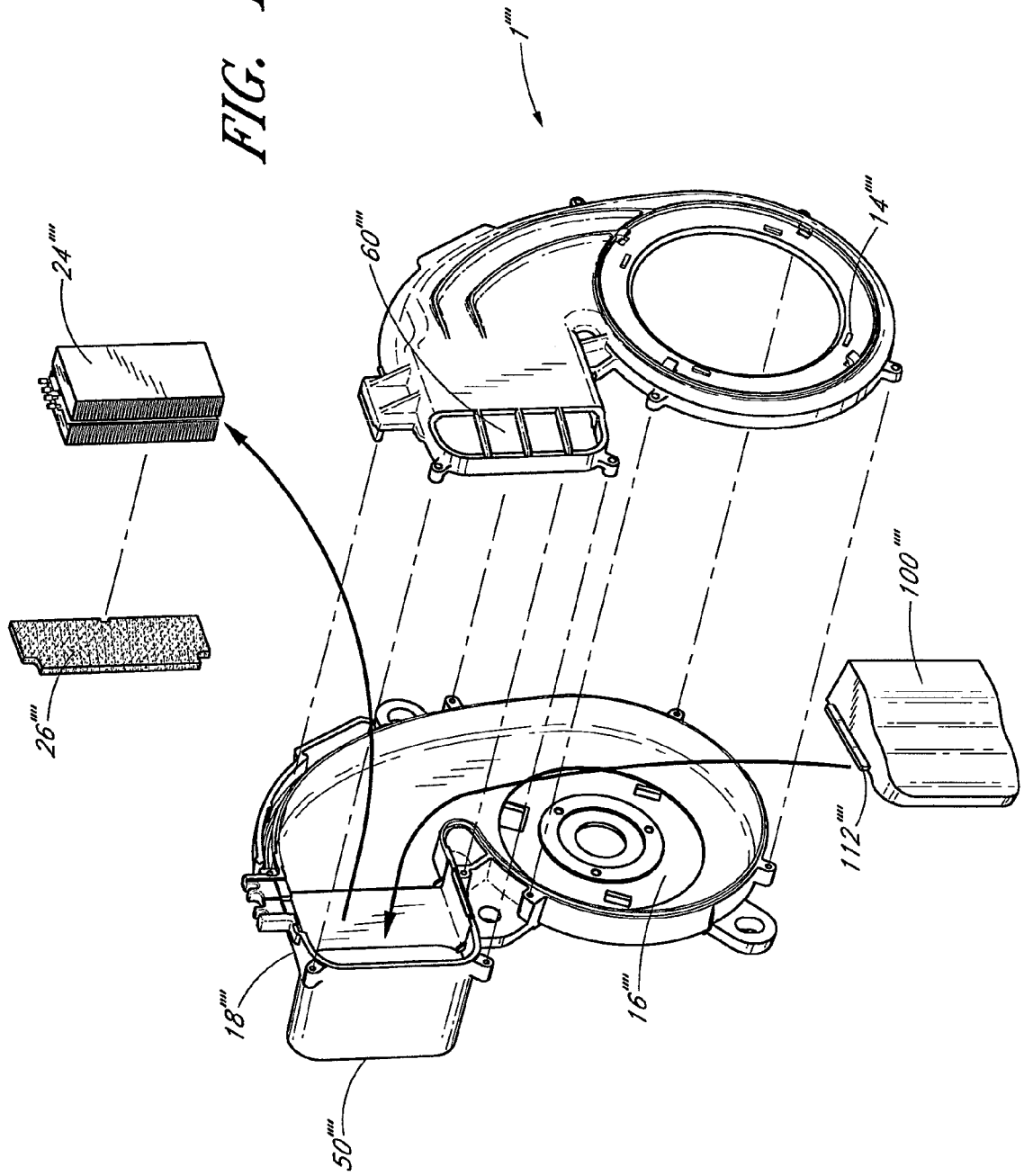

INSERT DUCT PIECE FOR THERMAL ELECTRIC MODULE

This application claims the priority benefit under 35 U.S.C. § 119(e) of Provisional Application 60/869,944, filed Dec. 14, 2006, the entire contents of which is hereby incorporated by reference herein.

BACKGROUND OF THE INVENTION

1. Field of the Invention

This invention relates to climate control. More specifically, this invention relates to climate control of a seat.

2. Description of the Related Art

Temperature modified air for environmentally controlled living or working space is typically provided to relatively extensive areas, such as entire buildings, selected offices, or suites of rooms within a building. In the case of vehicles, such as automobiles, the entire vehicle is typically cooled or heated as a unit. There are many situations, however, in which more selective or restrictive air temperature modifications is desirable. For example, it is often desirable to provide an individualized climate control for an occupant's seat so that substantially instantaneous heating or cooling can be achieved. For example, in an automotive vehicle exposed to summer weather, where the vehicle has been parked in an unshaded area for a long period of time, the vehicle seat can become very hot and uncomfortable for the occupant for some time after entering and using the vehicle, even with normal air conditioning. Furthermore, even with normal air conditioning, on a hot day, the seat occupant's back and other pressure points may remain sweaty while seated. In the winter time, it is highly desirable to have the ability to quickly warm the seat of the occupant to facilitate the occupant's comfort, especially where the normal vehicle heater is unlikely warm the vehicle's interior as quickly. For reasons such as these, there have long been various types of individualized climate control systems for vehicle seats.

Such climate control systems typically include a distribution system comprising a combination of channels and passages formed in the cushion of this seat. Climate conditioned air is supplied to these channels and passages by a climate controlled device. Climate conditioned air flows through the channels and passages to cool or heat the space adjacent the surface of the vehicle seat.

There are, however, problems that have been experienced with existing climate control systems for seats. For example, some climate control systems can involve many, expensive components. One way to reduce the complexity and cost of systems is to adapt the various components for performance in multiple configurations.

SUMMARY OF THE INVENTION

Accordingly, one aspect of the present invention comprises a climate control device that includes a housing, the housing having a first intake port, a first exhaust port, and a second exhaust port. A fan is disposed within the housing and is configured to draw air through the first intake port and expel air towards the first exhaust port and the second exhaust port. a separate insert piece configured to be inserted within the housing and adapted to direct substantially all the expelled air through one of the first or second exhaust ports.

Another aspect of the present invention comprises a vehicle seat assembly that includes a seat comprising a seat portion having a seat cushion, wherein a plurality of channels is disposed in the seat cushion. A climate control device comprises a housing, the housing having a first intake port, a first exhaust port and a second exhaust port. A fan is disposed within the housing and is configured to draw air through the first intake port and expel air towards the first exhaust port and the second exhaust port. A removable insert piece is configured to be disposed within the housing and adapted to direct substantially all the expelled air through one of the first or second exhaust ports.

Another aspect of the present invention is a method of manufacturing a climate control device. The method comprises providing a housing, the housing having a first intake port for receiving air from a fan, a first exhaust port and a second exhaust port. Selecting one of a thermoelectric device and an insert piece device, wherein the thermoelectric device is adapted to selectively heat or cool air downstream from the fan and the insert piece device is configured to direct substantially all the expelled air through one of the first or second exhaust ports. The selected device is positioned within the housing.

BRIEF DESCRIPTION OF THE DRAWINGS

FIG. 4 is top view of an insert piece;

FIG. 5 is a bottom view of the insert piece of FIG. 4;

FIG. 6 is a side view of the insert piece of FIG. 4;

FIG. 7 is a top, front, and left perspective view of the insert piece of FIG. 4;

FIG. 8 is a bottom, rear, and right perspective view of the insert piece of FIG. 1A;

FIG. 16 is an exploded view of an alternative embodiment of a climate control assembly that includes an insert piece.

DETAILED DESCRIPTION OF THE PREFERRED EMBODIMENTS

Figure 1:
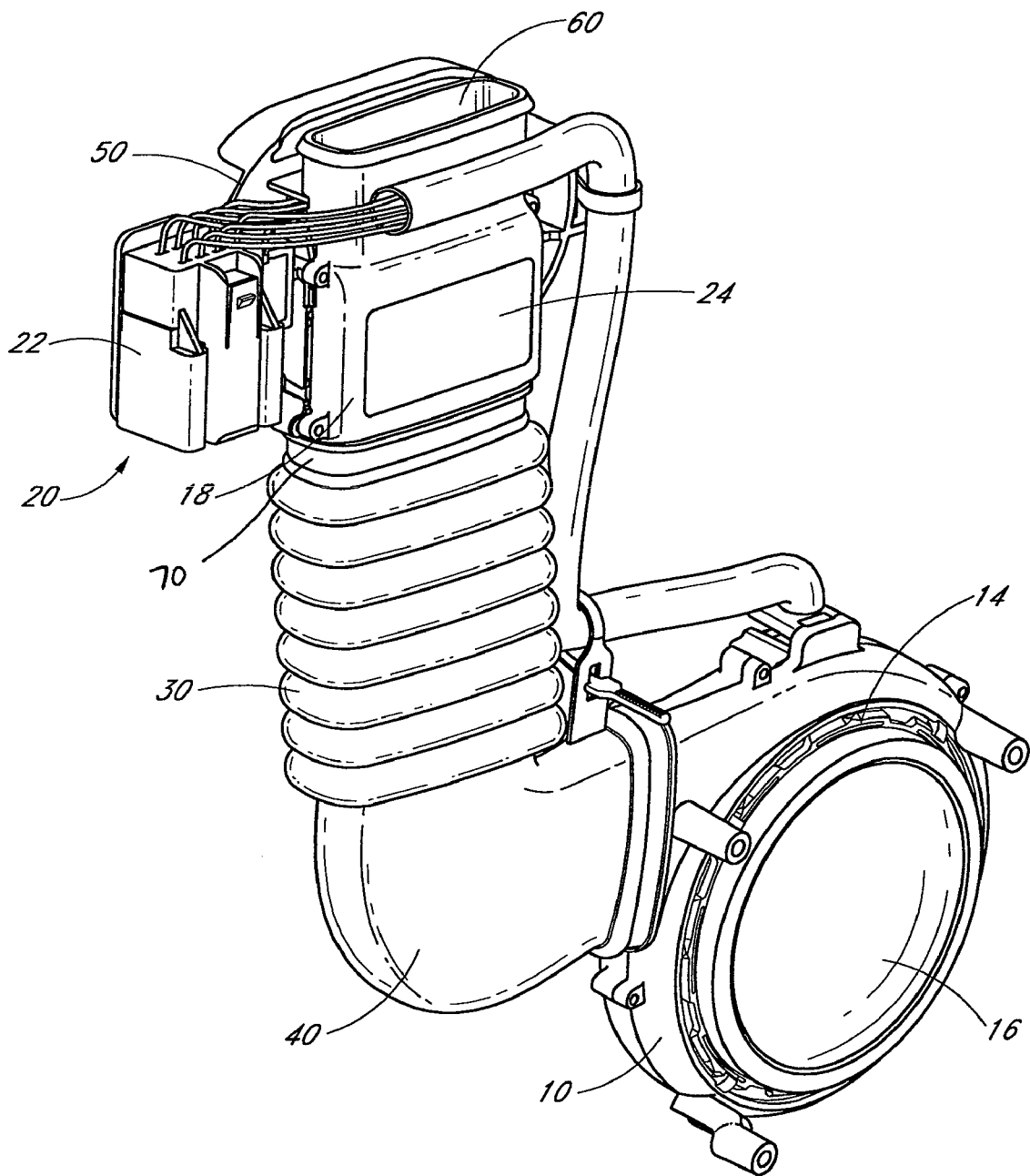
FIG. 1 is a perspective view of a climate control assembly.
Figure 3:
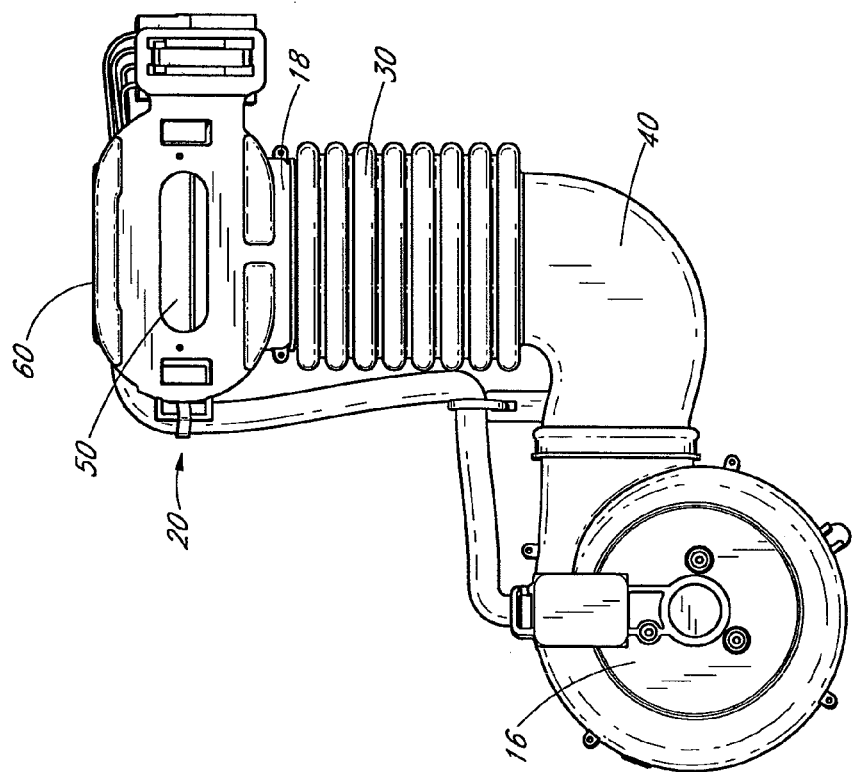
FIG. 3 is a bottom view of the climate control assembly of FIG. 1.
Figure 2:
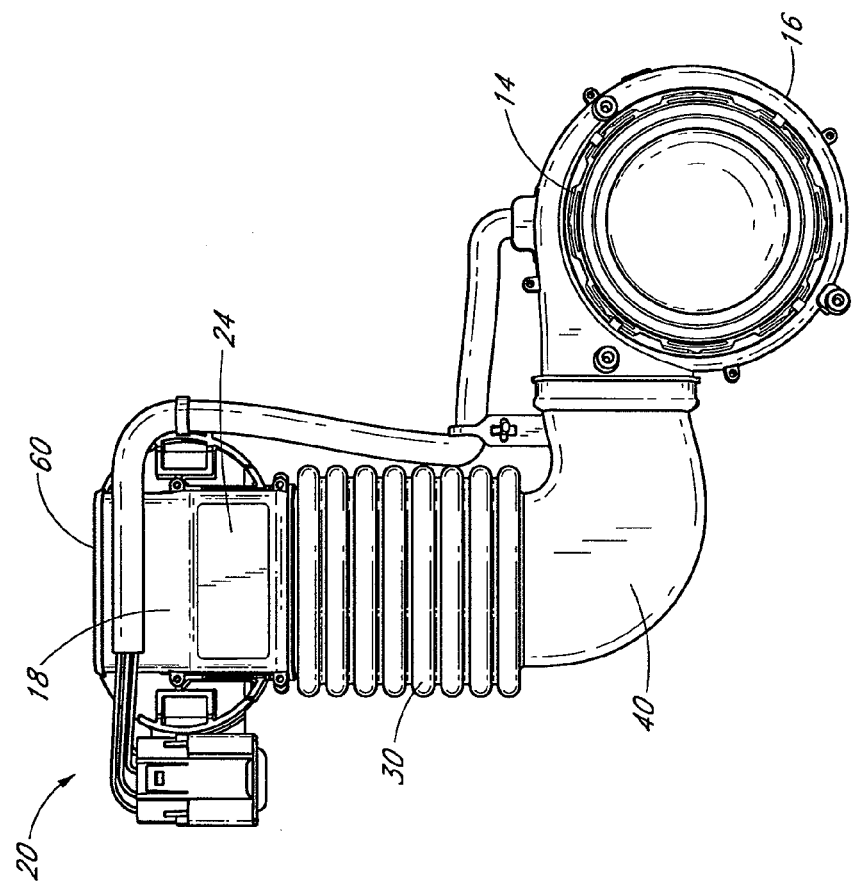
FIG. 2 is a top view of the climate control assembly of FIG. 1.

FIGS. 1, 2, and 3 illustrate one embodiment of a climate control assembly 1. As shown, in the illustrated embodiment the assembly 1 includes a housing 10 that defines, at least in part, a fan chamber 16, which contains a fluid pump (e.g., a fan). The fan draws air through an air intake 14 and directs it through a rigid conduit 40 and a flexible conduit 30, after which the air passes through a thermoelectric assembly 20 before exiting through a first exhaust port 50 and a second exhaust port 60.

The above described components of the assembly 1 can be constructed of a plastic, a metal, a ceramic, or any other material suitable for containing a flow of air. In the illustrated embodiment, the fan is a radial fan, and the fan chamber 16 has a circular shape to contain the fan. In other embodiments, different fan types (e.g., axial) can be used. The fan can be operated in several states, resulting in higher speeds and greater air transfer rates, or lower speeds and lesser air transfer rates.

In the illustrated embodiment, the rigid conduit 40 is in fluid communication with the fan chamber 16. The rigid conduit 40 can be formed integrally with or coupled to the fan chamber 16. The rigid conduit 40, in turn, is in fluid communication with the flexible conduit 30. In the illustrated embodiment, the rigid conduit 40 directs the air to turn approximately 90° prior to connecting to the flexible conduit 30. As can be seen below, the orientation and length of both the rigid conduit 40 and flexible conduit 30 can be varied to adapt the climate control assembly 1 to a variety of applications and configurations.

The rigid conduit 40 can be composed of the same material as the fan chamber, or a different material. The rigid conduit 40 can be sufficiently stiff to maintain the position of the components on either side of it relative to each other. In other embodiments, the rigid conduit 40 is not stiff or rigid, and permits some variation in position in connected components.

The flexible conduit 30 can be of a bellows-type, as in the embodiment illustrated in FIGS. 1, 2, and 3 and can be formed of a flexible material such as rubber. In other embodiments, the flexible conduit 30 can be composed of different materials, including without limitation, plastic, cloth, metal, or any other material capable of maintaining fluid communication and permitting self-deformation to alter the position of adjacent components.

As shown in FIGS. 1-3, in the illustrated embodiment, the thermoelectric assembly 20 is disposed remotely from the fan housing 16, but as will be described below, the positioning and orientation of the thermoelectric assembly 20 with respect to the fan housing 16 can be arranged in several ways.

In the illustrated embodiment (see FIG. 9), the thermoelectric assembly 20 comprises a thermoelectric housing 18, which defines in part the first exhaust port 50, the second exhaust port 60, and an inlet 70. A thermoelectric device 24 (e.g., a Peltier circuit) can be positioned within and/or supported by the thermoelectric assembly 20. While in the preferred embodiment, the thermoelectric device 24 comprises a Peltier circuit 26, in other embodiments other thermoelectric devices and/or other types of heating and/or cooling devices can be used (e.g. resistive heaters). The thermoelectric device 24 generally comprises the Peltier circuit 26, which is positioned between first heat exchangers 25a and a second heat exchanger 25b.

In the illustrated embodiment, the thermoelectric housing 18 and the thermoelectric device 24 are configured to divide the flow of air from the flexible conduit 30 towards the first exhaust port 50 and the second exhaust port 60. The air flowing through the first heat exchanger 25a is directed to the first exhaust portion 50 while the air flowing through the second heat exchanger 25b is directed through the second exhaust port 60. The first and second exhaust ports 50, 60, in turn, can be configured to direct the flow of air and force air in different directions, as shown in the embodiment illustrated in FIG. 1, or the first and second exhaust ports 50, 60 can allow air to leave the housing 10 in the same direction, but at different locations in the thermoelectric housing 18.

Some air from the flexible conduit 30, after separation of air flows, can be directed past an operational portion of the thermoelectric device 24 which can selectively condition the air, either cooler or warmer than ambient temperature. The conditioned air is then directed out the first exhaust port 50. Some of the air from the flexible conduit is directed towards a waste segment of the thermoelectric device 24, which adjusts the temperature of the air in the opposite manner as the conditioned air. That is, when the conditioned air is cooled, the waste air is heated, and when the conditioned air is heated, the waste air is cooled. The waste air is directed towards the second exhaust port 60.

In the illustrated embodiment, the first exhaust port 50 directs conditioned air at a 90° angle from the direction air is received from the flexible conduit 30. The second exhaust port 60 does not redirect the waste air, and the air exits the thermoelectric housing 18 in the same direction as it exited the flexible conduit 30. In other embodiments, the first exhaust port 50 can allow conditioned air to exit the thermoelectric housing 18 without altering its course, and the second exhaust port 60 can either permit waste air to pass in a direction parallel to the conditioned air or redirect the waste air in a different direction.

Thus, air is drawn through the air intake 14, accelerated by the fan in the fan housing 16, and directed through a rigid conduit 40 and a flexible conduit 30, and enters into the thermoelectric assembly 20. The air directed to the first exhaust port 50 can be cooled or heated. If the air in the first exhaust port 50 is heated, cooled air is transmitted through the second exhaust port 60. If the air in the first exhaust port 50 is cooled, heated air is transmitted through the second exhaust port 60.

The first exhaust port 50 can be coupled to a conduit or channel in another apparatus to provide conditioned air to a target area. For example, in one embodiment, the exhaust port 50 is coupled to a ventilation system provided in an automobile seat assembly. In other embodiments, the exhaust portion is coupled to a ventilation system for a bed, chair, wheelchair or other apparatuses. In general, the apparatus includes a ventilation system that includes one or more channels that are configured to distribute the conditioned air to a support surface of the device. The air flows through the support surface to providing a heating and/or cooling effect to the portion of the body supported by the support surface.

In some circumstances, it is desirable to omit the thermoelectric device 24 from the assembly 1 such that it can be configured to provide unconditioned air to the target area. In such an embodiment, it would be desirable to use the same assembly 1 as described above with minimal changes. Such an embodiment would advantageously allow the assembly to serve two purposes and reduce inventory costs. In such an embodiment, an insert piece 100, such as the one illustrated in FIGS. 4, 5, 6, 7, and 8, can be used. The insert piece 100 can be composed of plastic, ceramic, metal, cloth, or any other material capable of being appropriately configured and directing a flow of air. In the illustrated embodiment, the insert piece 100 is composed of plastic, and formed by blow-molding.

With reference to FIGS. 4, 5, 6, 7, and 8, in the illustrated embodiment, the insert piece 100 comprises an insert intake 102 and an insert exhaust 104. In the illustrated embodiment, the insert intake 102 and insert exhaust 104 face in different directions. Accordingly air entering the insert intake 102 can be directed to leave the insert piece 100 at the insert exhaust 104 in a direction 90° different from the insert intake direction. Other directions and orientations can be used, including those where the insert intake 102 and insert exhaust 104 face the same direction, or are at an angle other than 90°.

In the illustrated embodiment, the insert piece 100 has a securing face 110. The securing face 110 can surround the insert exhaust port 104, either partially or completely, as in the illustrated embodiment. The securing face 110 can be integral with the insert piece 100 or coupled to it. In the illustrated embodiment, the securing face 110 includes protrusions 112. The securing face 110 can have one protrusion 112, several, many, or none, depending on the shape of the securing face 110.

Figure 9:
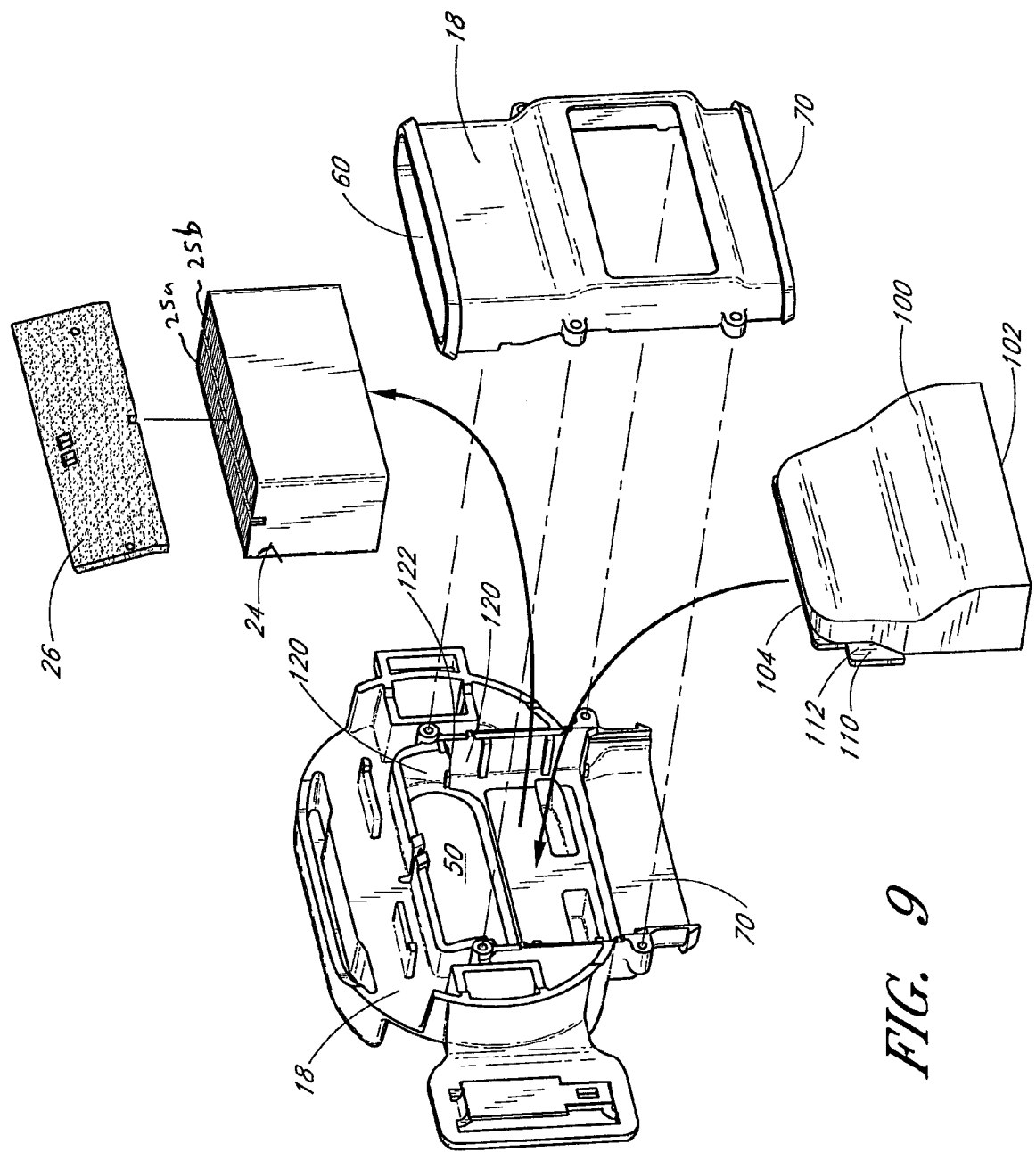
FIG. 9 is an illustration of a portion of a climate control assembly that includes the insert piece of FIG. 4.

As illustrated in FIG. 9, the thermoelectric housing 18 can be opened, and the thermoelectric device 24 can be removed from the thermoelectric housing 18. In other embodiments, the insert piece 100 can be disposed in the thermoelectric housing 18 during assembly of the climate control device 1. The insert piece 100 can be placed into the location configured to be occupied by the thermoelectric device 24. The securing face 110 can be shaped to accommodate grooves 120 and projections 122 near the first exhaust port 50. The protrusions 112 on the securing face 110 can be designed to extend into the grooves 120 and the securing face 110 lacks protrusions 112 where projections 122 abut the insert.

When the insert piece 100 is disposed in the thermoelectric housing 18 of the climate control device 1, the insert intake 102 captures all or substantially all of the flow of air entering an inlet 70 in the thermoelectric housing 18 from the flexible conduit 30. The shape of the insert piece 100 substantially inhibits the air from reaching the second exhaust port 60. Additionally, the air exhaust 104 is substantially aligned with the first exhaust port 50. Accordingly, substantially all of the air entering the inlet 70 from the flexible conduit 30 is redirected to exit the first exhaust port 50.

As can be seen in FIG. 9, the thermoelectric device 24 can be removed to allow the insert piece 100 to be positioned in the thermoelectric housing 18. Thus, the air passing through the thermoelectric housing 18 is no longer conditioned.

Figure 10:
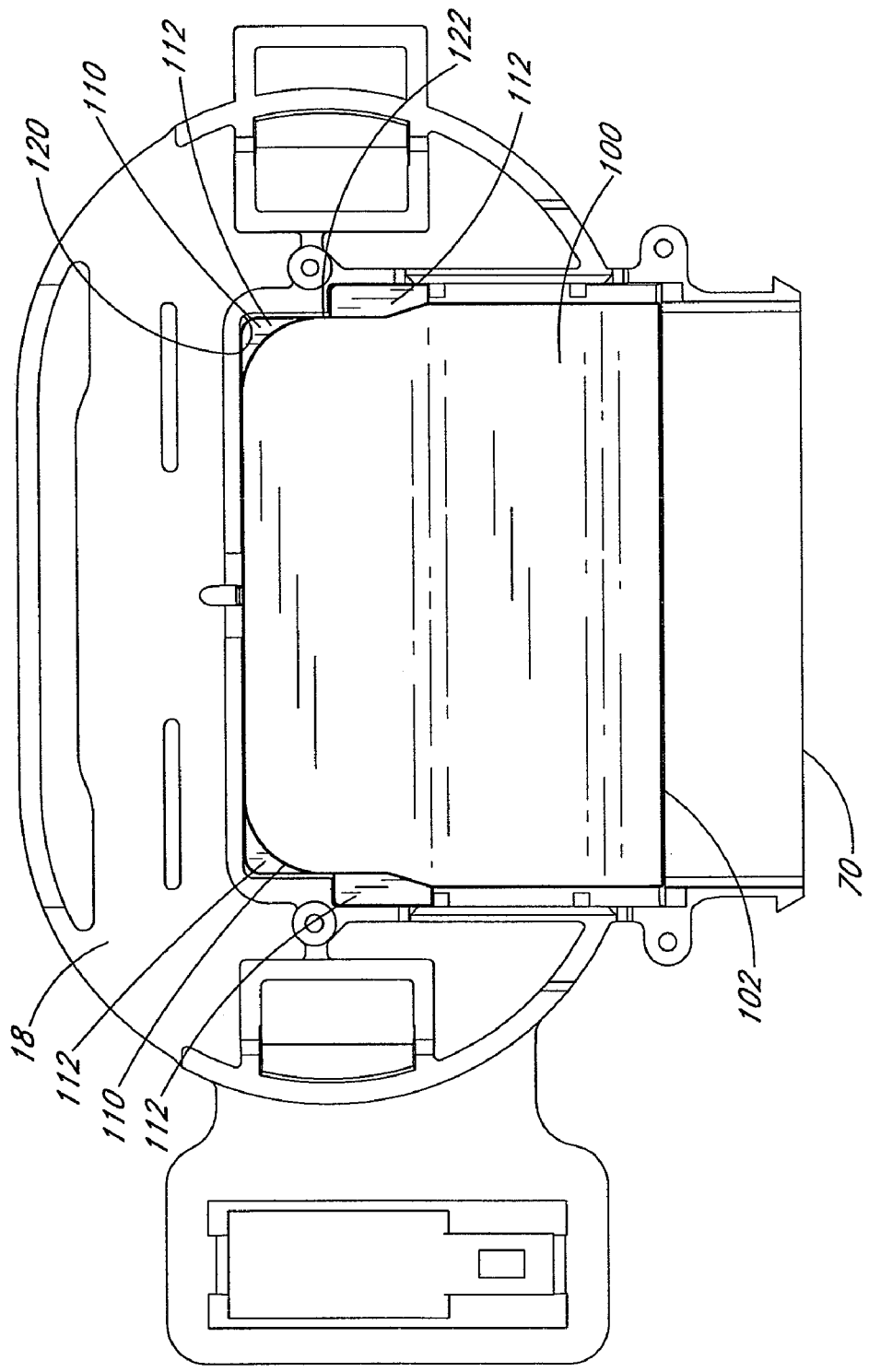
FIG. 10 is a top view of a portion of a climate control assembly including the insert piece of FIG. 4.

An assembled insert piece 100 and thermoelectric housing 18 are shown in FIG. 10. The insert piece 100 is disposed in the location previously containing the thermoelectric device 24. Accordingly, the thermoelectric housing 18 containing the insert piece 100 is preferably substantially the same shape and size as the thermoelectric housing 18 containing the thermoelectric device 24. Thus, the same thermoelectric housing 18 can be constructed for variations containing the thermoelectric device 24 and the insert piece 100.

For those thermoelectric housings 18 containing the insert piece 100, the second exhaust port 60 permits almost no air to exit, as the insert piece 100 redirects all or substantially all the air entering through the inlet 70 to the first exhaust port 50. Thus, in those climate control devices 1 where an insert piece 100 is used, the volume of air exiting through the first exhaust port 50 is greater than those with a thermoelectric device 24. The increase in air flow volume can be approximately double the air flow volume without the insert piece 100. The increase can be less than double, and can even be a decrease in overall air flow through the first exhaust port 50, as controlled by operation of the fan.

Figure 11:
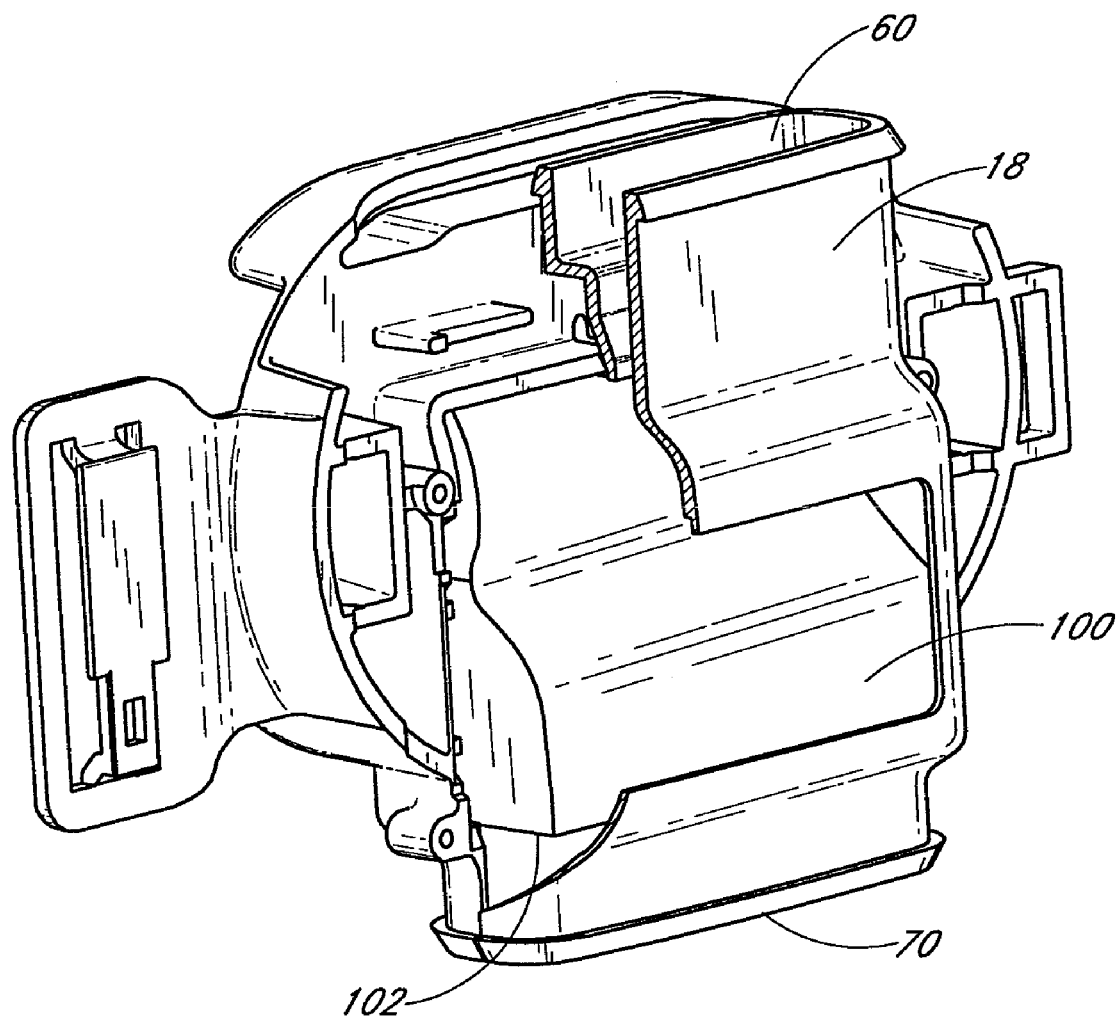
FIG. 11 is a cutaway perspective view of the portion of the climate control assembly of FIG. 10.

FIGS. 10 and 11 illustrate a detailed view of the thermoelectric assembly 20 containing an insert piece 100. As can be seen in FIG. 10, the protrusions 112 on the securing face 110 can be aligned to interface with the grooves 120 of the thermoelectric housing 18. Similarly, the insert piece 100 can have indentations to accommodate inwardly-extending projections 112 in the thermoelectric housing 18.

As illustrated in FIG. 10, when inserted into the thermoelectric housing 18, the insert exhaust 104 is directed towards the first exhaust port 50. Thus, air entering the insert intake 102 exits the climate control device 1 at the thermoelectric housing 18 through the first exhaust port 50. As shown in FIG. 11, the insert intake 102 is positioned to receive all or substantially all the air entering the inlet 70 of the thermoelectric housing 18. Accordingly, when the thermoelectric device 24 is replaced with the insert piece 100, air no longer exits through both the first and second exhaust ports 50, 60, but instead only through the first exhaust 50. The same housing 10 can be used to construct either a climate control device 1 providing air conditioned by a thermoelectric device 10 having a waste air exhaust port 60, or a climate control device 1 wherein the waste air exhaust port 60 is redirected to the first exhaust port 50.

Figure 12:
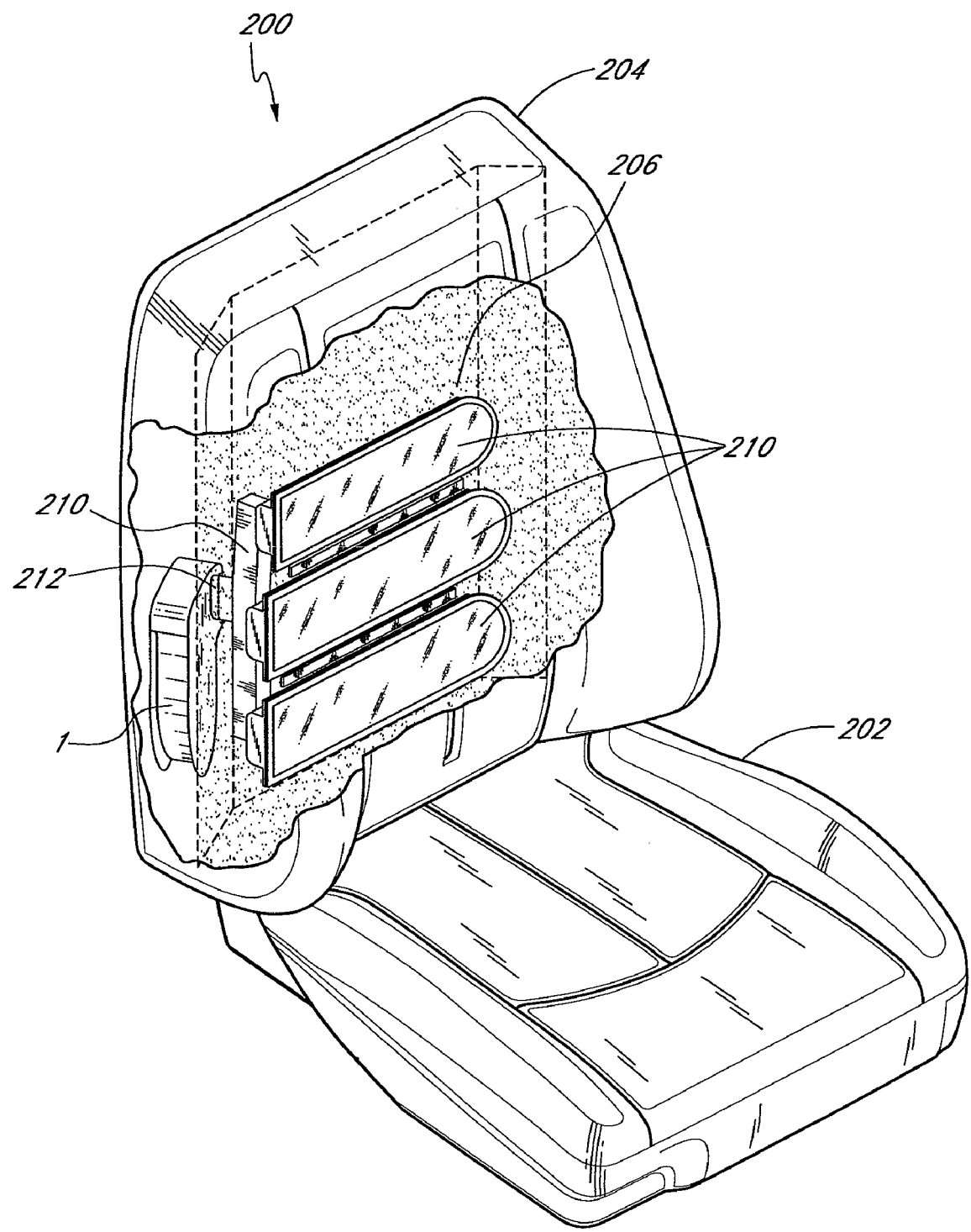
FIG. 12 is a perspective view of a vehicle seat assembly.

As shown in FIG. 12, the climate control device 1 can be mounted on the rear of a seat assembly, such as a vehicle seat assembly 200. One vehicle seat assembly 200 is described in U.S. patent application Ser. No. 11/364,841, the contents of which are incorporated herein by reference. In a vehicle seat assembly 200, a seat can be comprised of a seat portion 204 and a back portion 206. The back portion 206 can include a back cushion 206. The back cushion 206 can be composed of closed-cell foam, a fabric, a plastic, or any other appropriate material. A plurality of channel assemblies 208 can be disposed within the back cushion 206. The channel assemblies 208 can extend horizontally, as shown, or vertically, in an H-shape, or in any other appropriate configuration.

The channel assemblies 208 can be in fluid communication with a plenum 210. The plenum 210 can place several or all of the channel assemblies 208 in fluid communication with each other. In other embodiments, more than one plenum 210 can be used to connect the channel assemblies 208 in different configurations. The plenum 210 can place the channel assemblies 208 in common fluid communication with the climate control device 1 through a passageway 212. The passageway 212 can be integrally formed with either the plenum 210 or the climate control device 1, or can be a separate component coupling them. The passageway 212 can also be a combination of extensions from both the plenum 210 and the climate control device 1.

The climate control device 1 can be mounted on the rear side of the back portion 206, as illustrated. In other embodiments, the climate control device 1 can be mounted on the seat portion 204 or proximate to the seat or back portions 204, 206. The climate control device 1 can be any embodiment of a climate control device 1 described herein, including without limitation those in FIGS. 1, 2, 3, 13, 14, 15, and 16. The vehicle seat assembly 200 can be disposed in a personal automobile or other vehicle, such as a bus, plane, train, or ship.

When used with a vehicle seat assembly 200, the first exhaust port 50 of the climate control device 1 can be placed in fluid communication with the plurality of channel assemblies 208 through the passageway 212 and the plenum 210. In those embodiments of the climate control device 1 comprising a thermoelectric device 24, the device 1 can provide conditioned air to the channel assemblies 208 through the first exhaust port 50. In assemblies where the climate control device 1 comprises an insert piece 100, unconditioned air can be provided to the channel assemblies 208. In some vehicle seat assembly 200 embodiments, the passageway 212, plenum 210, or channel assemblies 208 can comprise a thermoelectric device, such as a resistive heater, which adjusts the temperature of the air within the back portion 204. In embodiments with a thermoelectric device disposed in the interior of a seat, the temperature of the air within the seat can be adjusted with an external control. Similarly, the climate control device 1 can be controlled by the same or a different controller, which can vary the fan operational state, including without limitation such states as high-power, medium-power, low-power, and off.

FIGS. 13, 14, 15, and 16 illustrate different embodiments of the climate control device 1. Except where noted, components are similar to already-numbered components, except that a single ('), double ("), triple ('''), or quadruple prime ('''') has been added to distinguish them.

Figure 13:
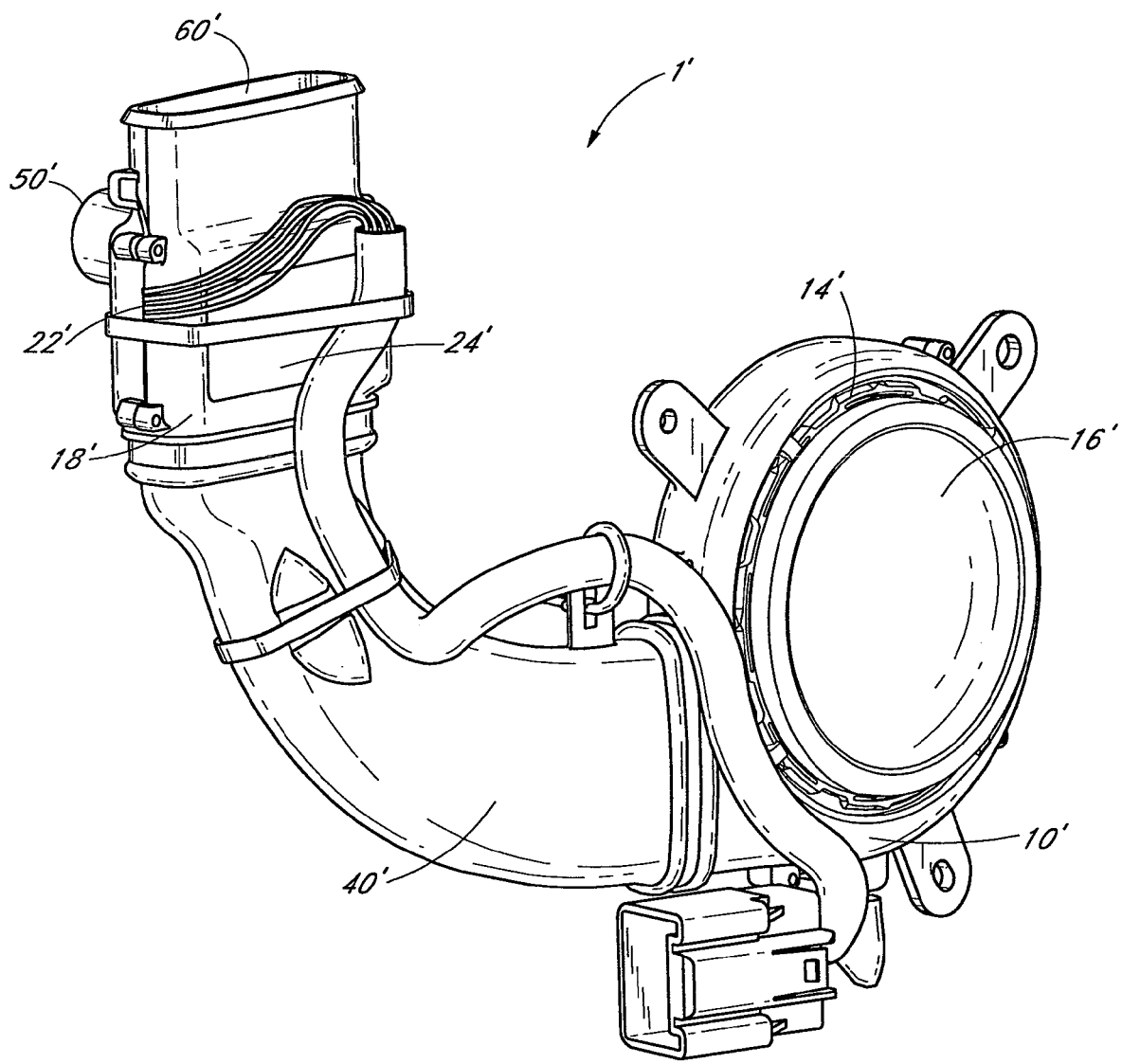
FIG. 13 is a perspective view of an alternative embodiment of a climate control assembly.

In the embodiment illustrated in FIG. 13, another climate control device 1' is shown. The climate control device 1' is adapted for certain types of uses where a flexible conduit 30 is not required. Instead, the rigid conduit 40' turns at an angle. In the illustrated embodiment, the thermoelectric assembly 20' is disposed at approximately 90° to the original conduit direction, and spaced a distance from the housing 10'. In other embodiments, other angles can be used. The insert piece 100' can replace the thermoelectric device 24' in the illustrated embodiment, redirecting air from the second exhaust port 60' to the first exhaust port 50'.

Figure 14:
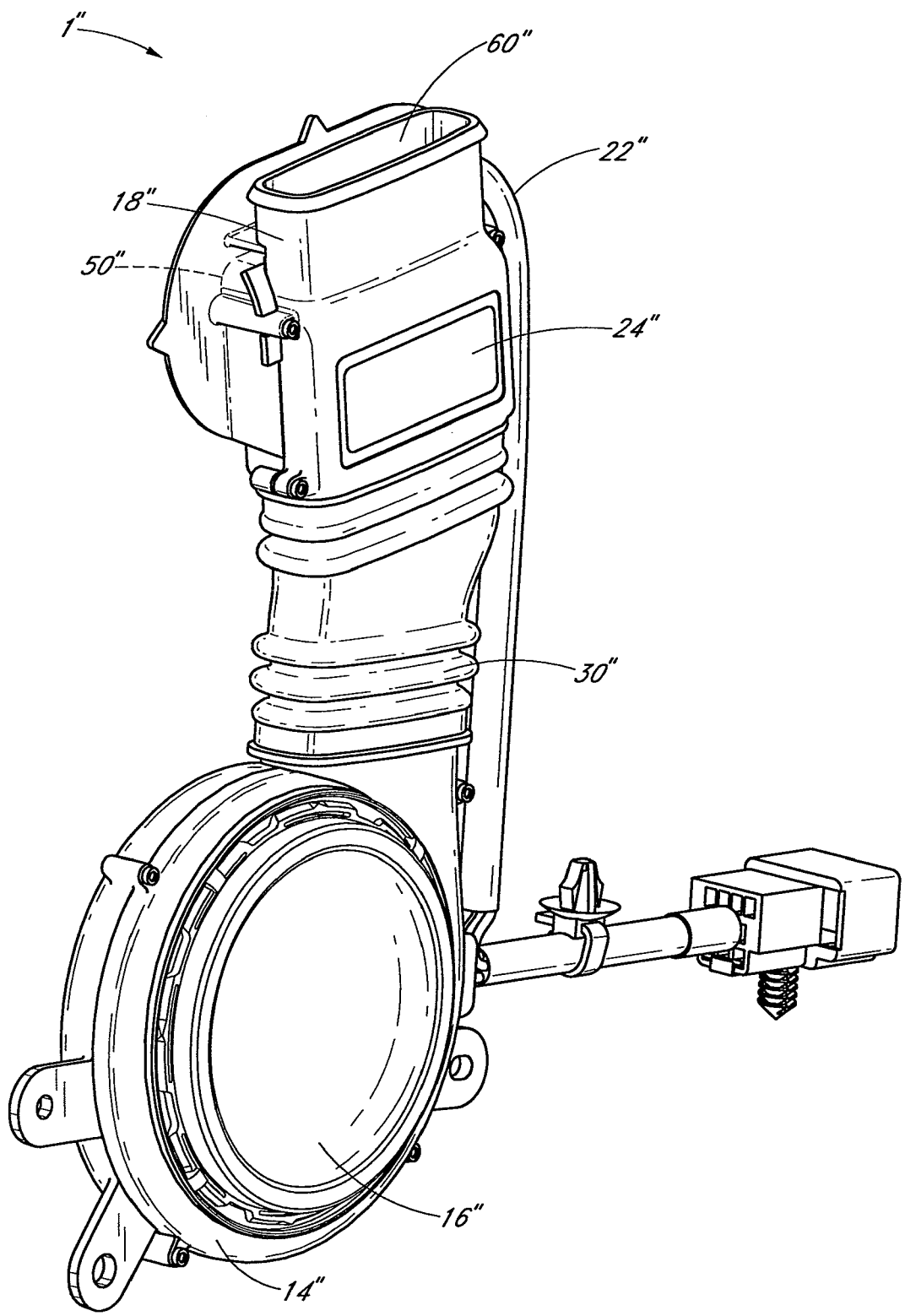
FIG. 14 is a perspective view of an alternative embodiment of a climate control assembly.

In FIG. 14, an embodiment of a climate control device 1" having only a flexible conduit 30" is shown. The flexible conduit 30" extends substantially straight with respect to the air flow exiting the housing 10", disposing the thermoelectric assembly 22" a distance from the housing 10", but not at an angle. In some embodiments, the flexible conduit 30" can be disposed to extend substantially straight from the housing 10", but at an angle to the air flow exiting the housing 10". The insert piece 10" can be disposed in the thermoelectric housing 18" in place of the thermoelectric device 24".

Figure 15:
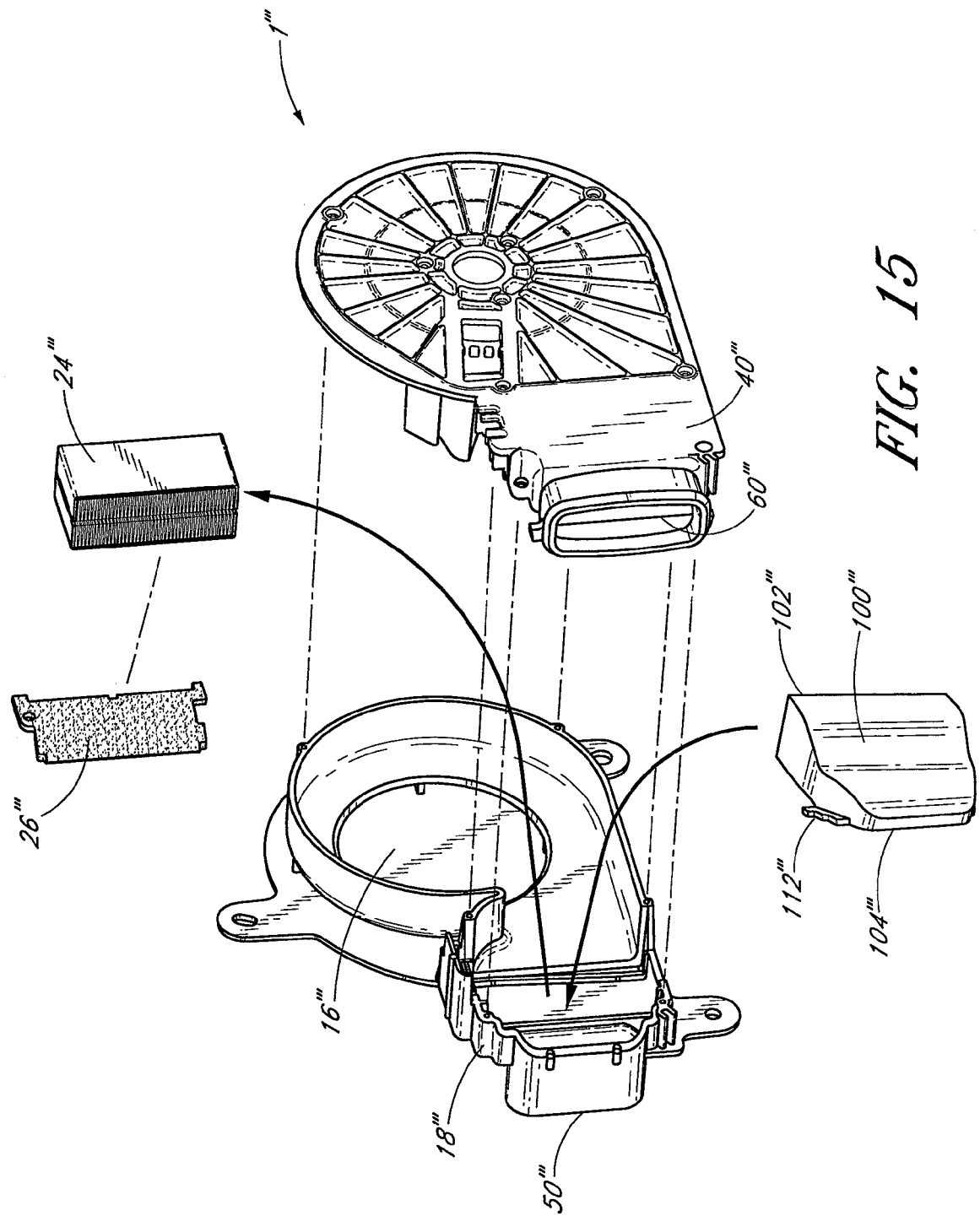
FIG. 15 is an exploded view of an alternative embodiment of a climate control assembly that includes an insert piece.

FIG. 15 illustrates an embodiment of a climate control device 1''' wherein the thermoelectric housing 18''' is integral with the housing 10''' and the fan housing 16''', and not extended a distance from the housing 10''' by a flexible or rigid conduit 30''', 40'''. Air directed by the fan from the fan housing 16''' flows in a substantially straight direction to the thermoelectric assembly 20'''. In other embodiments, air can be directed to flow in one or several different directions prior to reaching the thermoelectric assembly 20'''. In the illustrated embodiment, the thermoelectric device 24''' can be removed from the thermoelectric housing 18''', and the insert piece 100''' disposed in its place. Accordingly, air directed by the fan flows away from the fan housing 16''', and the insert piece 100''' redirects the air substantially entirely towards the first exhaust port 50''', occluding the second exhaust port 60'''.

In other embodiments, the thermoelectric housing 18''' can be spaced apart from the fan housing 16''', but still integral with the housing 10'''. In still other embodiments, the thermoelectric housing 18''' can be spaced apart from the fan housing 16''' and detached from the housing 10''', but in fluid communication with the housing 10''' and supported by another means besides a flexible or rigid conduit 30', 40'''.

In FIG. 16, an embodiment of a climate control device 1'''' wherein the thermoelectric housing 18'''' is integral with the housing 10'''' and the air flow is redirected at an angle prior to passing through the thermoelectric housing 18'''' is shown. The thermoelectric housing 18'''' receives the flow of air at an angle of approximately 90° to the original flow of air leaving the fan housing 16''''. In other embodiments, other angles can be used.

As shown, the thermoelectric device 24'''' can be removed from the thermoelectric housing 18'''' and an insert piece 100'''' disposed in its location. Accordingly, air is substantially inhibited from leaving through the second exhaust port 60'''' and redirected to the first exhaust port 50''''.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while the number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with, or substituted for, one another in order to perform varying modes of the disclosed invention. Thus, it is intended that the scope of the present invention herein disclosed should not be limited by the particular disclosed embodiments described above, but should be determined only by a fair reading of the claims.

What is claimed is:

1. A vehicle seat assembly comprising:
   a seat comprising a seat portion having a seat cushion, wherein a plurality of channels is disposed in the seat cushion; and
   a climate control device comprising:
      a housing, the housing having a first intake port, a first exhaust port, and a second exhaust port;
      a fan disposed within the housing and configured to draw air through the first intake port and expel air towards the first exhaust port and the second exhaust port;
      a removable insert piece configured to be disposed within the housing and adapted to direct substantially all the air entering the first intake port through only one of the first or second exhaust ports; and
      a thermoelectric element disposed in the climate control device;
   wherein the thermoelectric element is disposed in the at least one of the plurality of channels.

2. The vehicle seat assembly of claim 1, wherein the seat portion comprises a lower portion and a back portion.

3. The vehicle seat assembly of claim 2, wherein the lower portion comprises a lower cushion.

4. The vehicle seat assembly of claim 3, wherein at least one of the plurality of channels is disposed in the lower cushion.

5. The vehicle seat assembly of claim 1, wherein the first exhaust port opens in a different direction than the second exhaust port.

6. A method of manufacturing a climate control device, the method comprising the steps of:
   providing housing, the housing having a first intake port for receiving air from a fan, a first exhaust port, and a second exhaust port;
   selecting one of a thermoelectric device and an insert piece device, wherein the thermoelectric device is adapted to selectively heat or cool air downstream from the fan, wherein the insert piece device is configured to direct substantially all air entering the first intake port through one of the first or second exhaust ports; and
   positioning the thermoelectric device or the insert piece device in the housing;
   wherein positioning the thermoelectric device or the insert piece device comprises disposing the thermoelectric device in a first location within the housing or disposing the insert piece device in a second location within the housing.

7. The method of claim 6, wherein positioning the selected device comprises disposing the selected device in a portion of the housing downstream of the fan.

8. The method of claim 6, wherein positioning the selected device comprises positioning the thermoelectric device in the first location within the housing.

9. A climate control system configured to selectively provide either thermally conditioned or ambient air to a seat assembly, comprising:
- a housing comprising an inlet port, a main exhaust port and a waste exhaust port;
- wherein the housing is configured to receive a thermoelectric device or an insert device; and
- a fluid transfer device positioned within the housing, said fluid transfer device configured to receive air through the inlet port and to deliver said air to at least one of the main exhaust port and the waste exhaust port;
- wherein the main exhaust port is in fluid communication with a fluid distribution system of the seat assembly, so that air passing through the main exhaust port and the fluid distribution system is generally delivered toward a seated occupant;
- wherein the climate control system is configured to be operated either under a first mode of operation or a second mode of operation;
- wherein, under the first mode of operation, air is transferred by the fluid transfer device from the inlet port to both the main exhaust port and the waste exhaust port;
- wherein, under the first mode of operation, a thermoelectric device is positioned within the housing, said thermoelectric device being configured to selectively heat or cool air being transferred from the inlet port to the main exhaust port;
- wherein, under the second mode of operation, air is transferred by the fluid transfer device from the inlet port to substantially only the main exhaust port; and
- wherein, under the second mode of operation, an insert device is positioned within the housing.

10. The climate control system of claim 9, wherein the insert device is configured to substantially prevent air from passing through the waste exhaust port.

11. The climate control system of claim 9, wherein, under the second mode of operation, ambient air is directed through the insert device, the main exhaust port and the fluid distribution system of the seat assembly.

12. The climate control system of claim 9, wherein, under the second mode of operation, thermally-conditioned air is directed to the fluid distribution system of the seat assembly.

13. The climate control system of claim 12, wherein air is selectively thermally conditioned upstream of the insert device.

14. The climate control system of claim 12, wherein air is selectively heated using a resistive heater.

* * * * *